(12) United States Patent
Kirchhof et al.

(10) Patent No.: US 7,174,765 B2
(45) Date of Patent: Feb. 13, 2007

(54) FLANGE SLEEVE, METHOD FOR THE PRODUCTION THEREOF AND BENDING TOOL FOR PRODUCING FLANGES ON A SLEEVE

(75) Inventors: Klaus Kirchhof, Niedernhausen (DE); Konstantinos Valasiadis, Wiesbaden (DE)

(73) Assignee: Federal-Mogul Wiesbaden GmbH & Co. KG, Wiesbaden (DE)

( * ) Notice: Subject to any disclaimer, the term of this patent is extended or adjusted under 35 U.S.C. 154(b) by 165 days.

(21) Appl. No.: 10/467,701

(22) PCT Filed: Jan. 31, 2002

(86) PCT No.: PCT/DE02/00338

§ 371 (c)(1),
(2), (4) Date: Dec. 8, 2003

(87) PCT Pub. No.: WO02/064283

PCT Pub. Date: Aug. 22, 2002

(65) Prior Publication Data

US 2004/0078977 A1   Apr. 29, 2004

(30) Foreign Application Priority Data

Feb. 14, 2001  (DE) ................. 101 07 109

(51) Int. Cl.
*B21D 31/00* (2006.01)

(52) U.S. Cl. ................. 72/379.2; 29/898.057

(58) Field of Classification Search ........... 29/898.056, 29/898.057, 898.058, 898.054; 72/51, 379.2, 72/355.4; 384/275, 296, 288, 294
See application file for complete search history.

(56) References Cited

U.S. PATENT DOCUMENTS

| 4,017,127 | A | * | 4/1977 | Smith et al. ................. 384/294 |
| 4,048,703 | A | * | 9/1977 | Lehnhart ................ 29/898.057 |
| 5,520,466 | A | * | 5/1996 | Everitt et al. ................ 384/294 |

FOREIGN PATENT DOCUMENTS

| DE | 2 049 184 | | 4/1972 |
| DE | 2049184 | * | 4/1972 |
| DE | 24 06 361 | | 8/1975 |
| DE | 195 24 757 A1 | | 1/1997 |

* cited by examiner

*Primary Examiner*—Lowell A. Larson
*Assistant Examiner*—Debra Wolfe
(74) *Attorney, Agent, or Firm*—Robert L. Stearns; Dickinson Wright PLLC

(57) ABSTRACT

A flange sleeve comprising at lest one flange formed thereon, having no gap at the joint or having a controllably adjusted width of the gap at the joint. The flange has two crowding recesses at least in the metal coating thereof in at least two points distributed over the flange in the direction of the periphery. According to the method for producing the flange sleeves, the edge of the flange is bent. At least two crowding recesses in at least two points distributed over the flange in the direction of the periphery are made at least in the metal coating thereof, the recesses preferably being made by bending the edge of the sleeve. The invention also relates to a bending tool and a bending device.

6 Claims, 7 Drawing Sheets

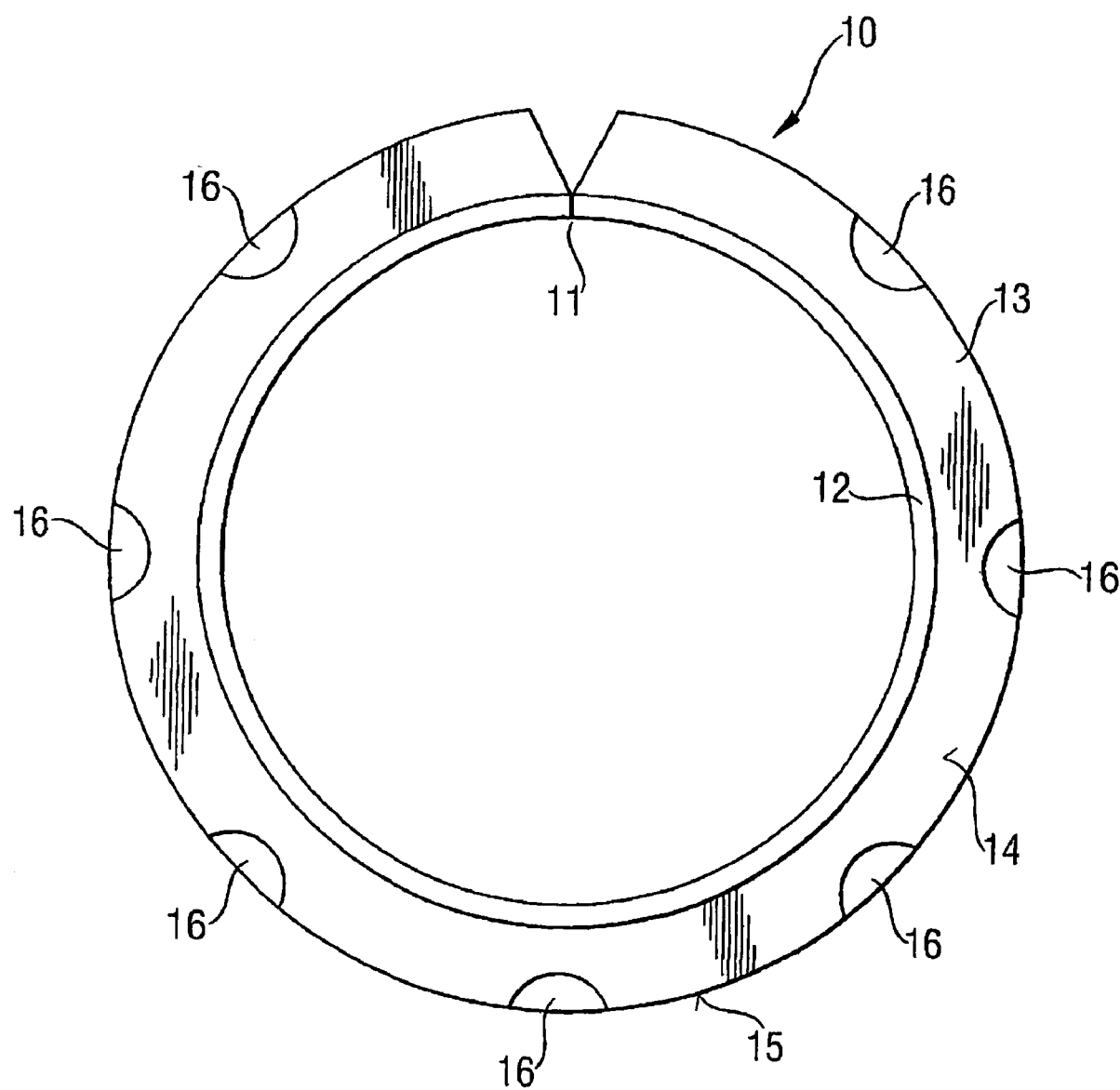

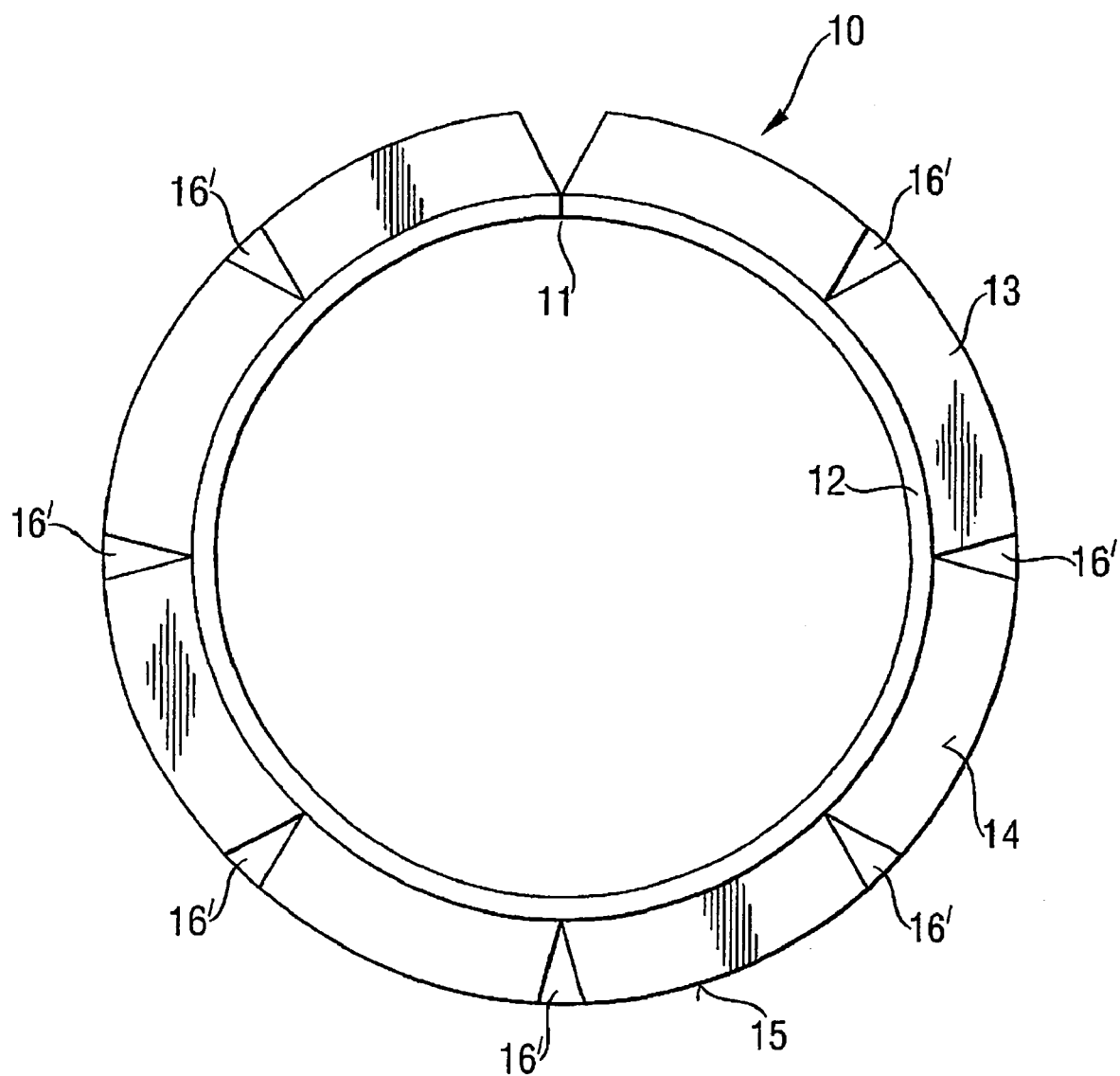

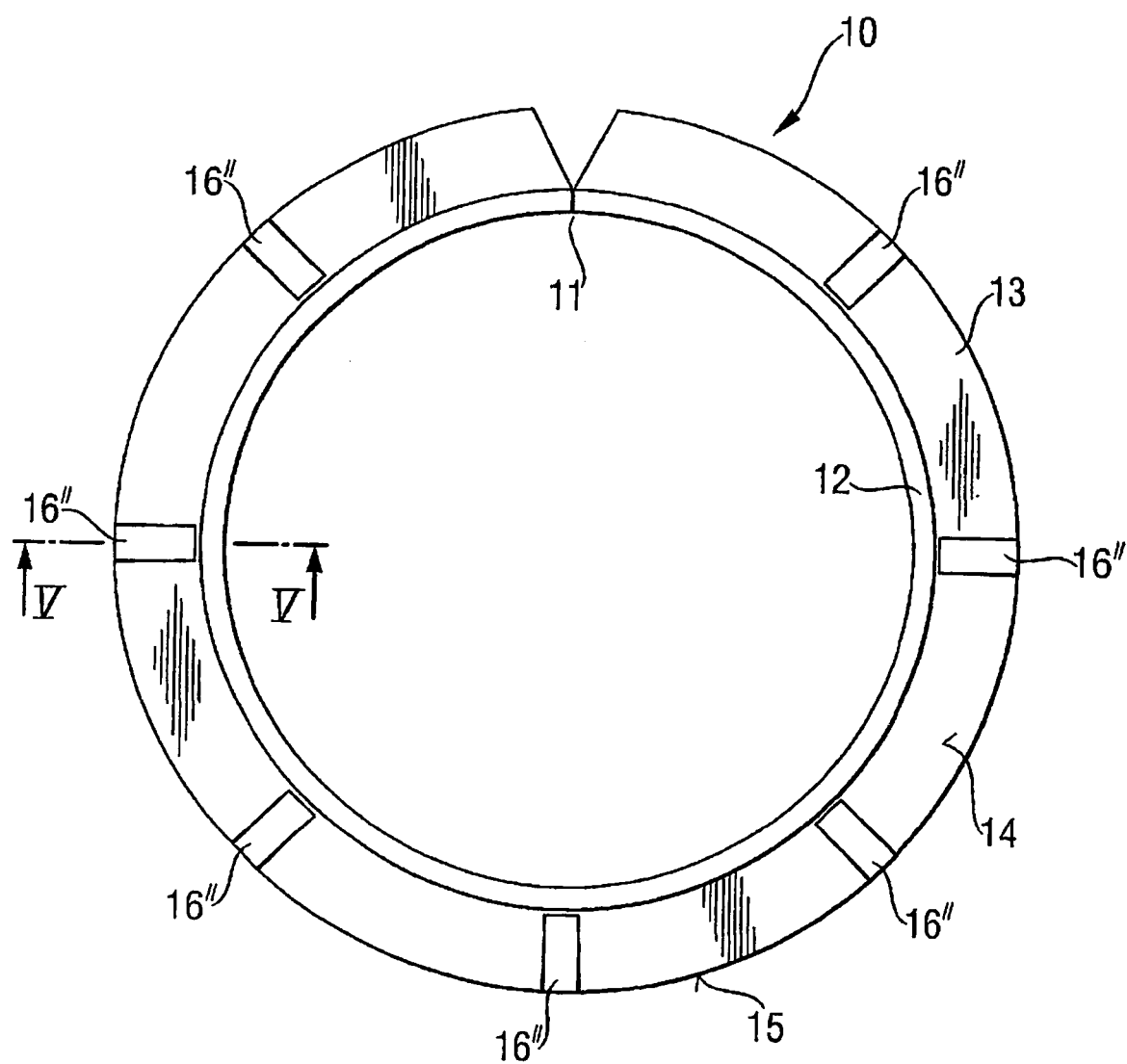

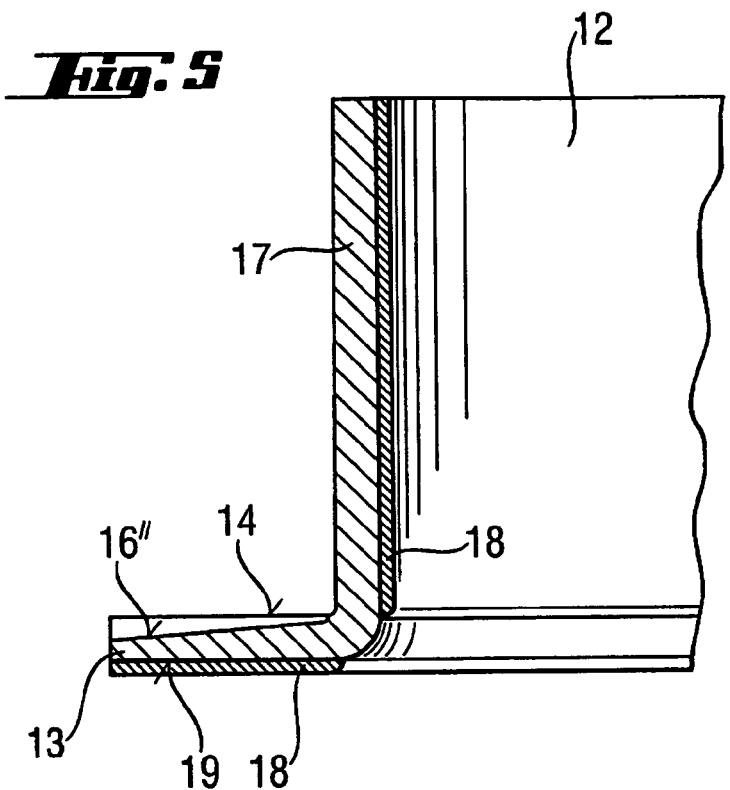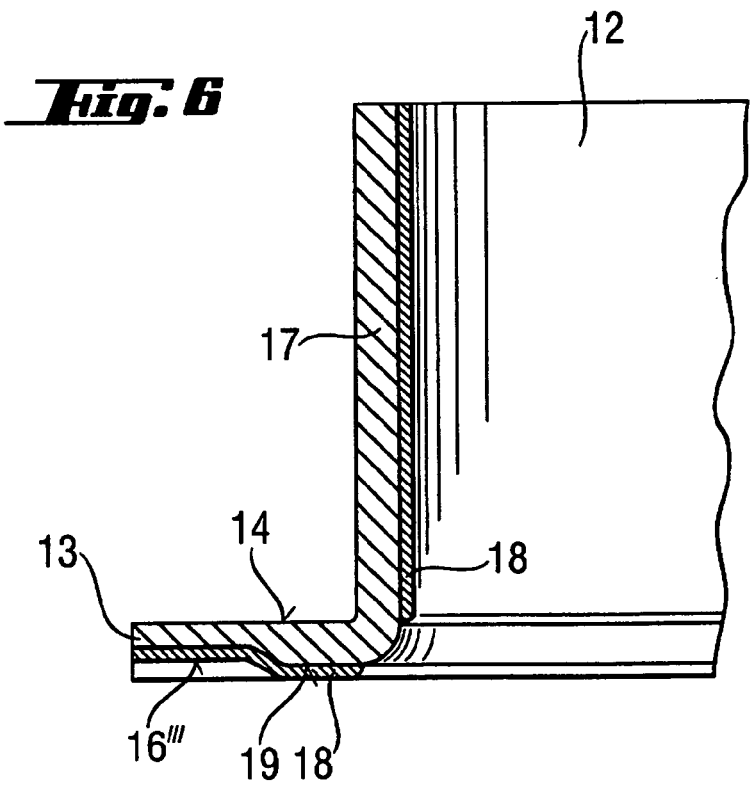

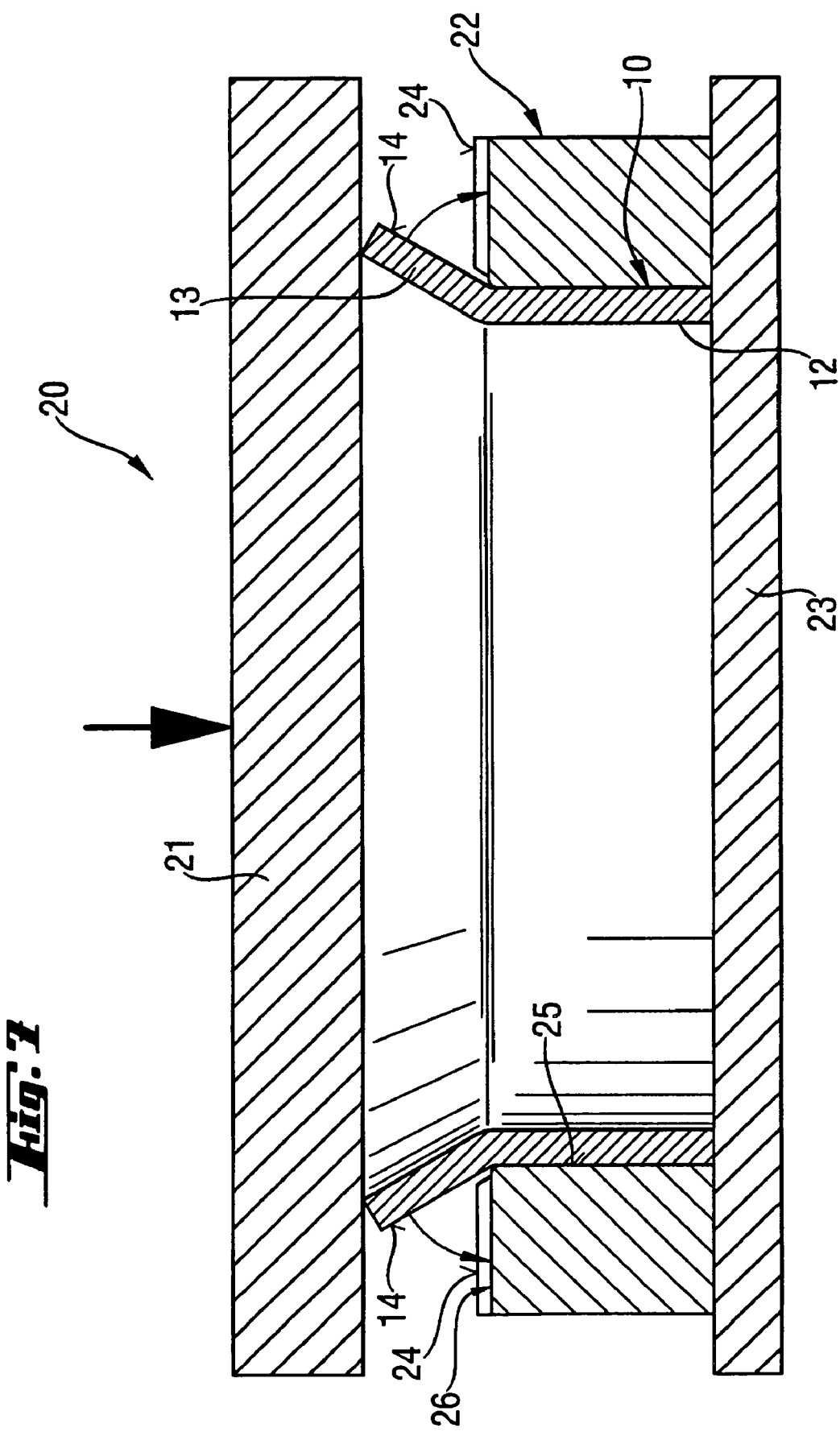

Figure 1:
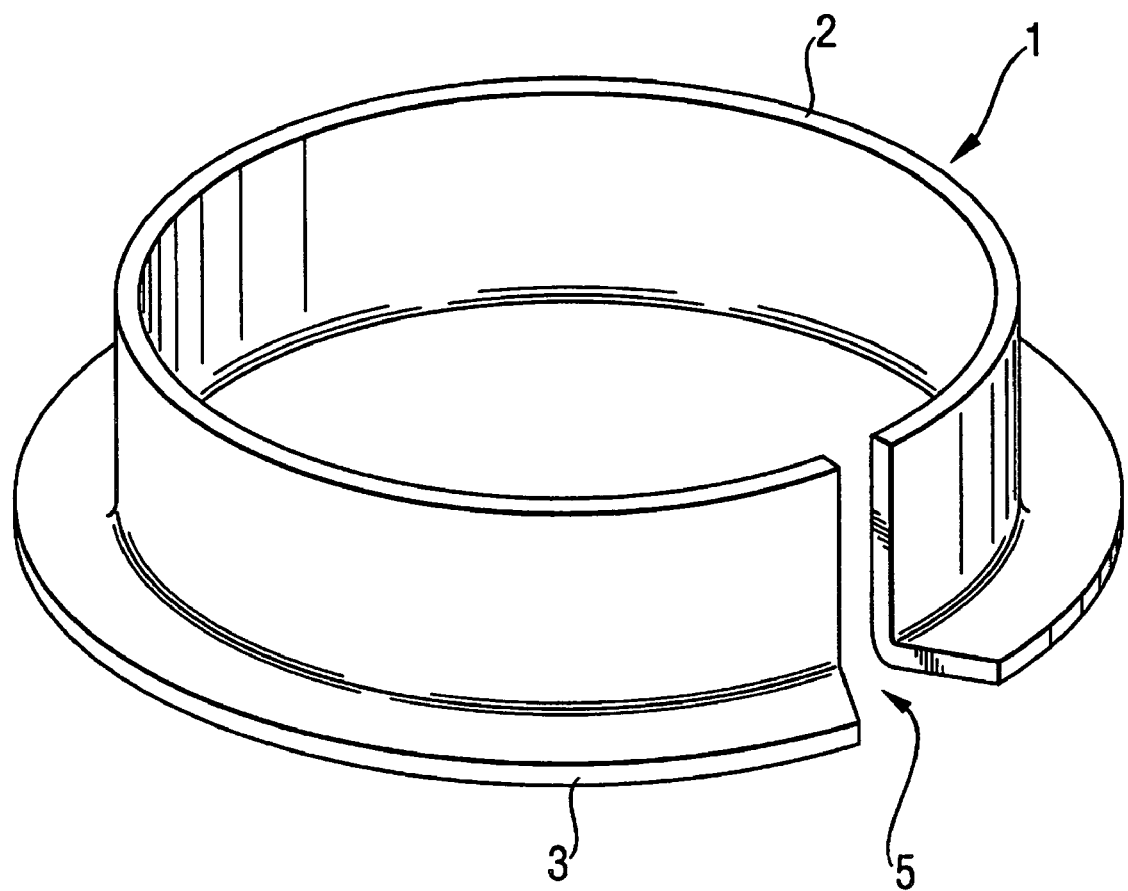

FLANGE SLEEVE, METHOD FOR THE PRODUCTION THEREOF AND BENDING TOOL FOR PRODUCING FLANGES ON A SLEEVE

BACKGROUND OF THE INVENTION

1. Technical Field

The invention relates to a flanged bush, in particular a flanged bush for plain bearings with at least one flange formed thereon, and to, a method for the production thereof and a bending die.

2. Related Art

Flanged bushes, which comprise either one or two flanges, are known in a very wide range of sizes, with diameters ranging from centimeters to decimeters. The materials used depend on the intended application, wherein the bush material may be of single- or multilayer construction. Single-layer bushes are known as solid bushes. Bushes of multilayer construction generally comprise a backing material and an overlay. The overlay may consist of a metal alloy or plastics. The invention relates to all flanged bushes, irrespective of their dimensions, intended purpose and the materials used, with the one reservation that the flanged bushes have to comprise at least one metallic layer.

To produce flanged bushes, an edge of prefabricated bearing sleeves or bushes is bent into a flange in a secondary operation. A conventional method is bush wrapping, wherein a flat strip portion, the so-called blank, is wrapped round to form a bush or sleeve.

In the case of wrapped bearing bushes, it is generally necessary for the butt joint to be closed when the bush is fitted, while the butt joint is generally not fully closed when the bearing bush is not fitted, since the material springs open to a greater or lesser degree depending on the method used to produce the bush 9c.f. DIN 1494, part 1, June 1983, p. 1).

Production methods for wrapped bushes are known and are described for example by Dipl.-Ing. Hugo Kotthaus in 'Betriebstechnisches Taschenbush", vol. 2, $7^{th}$ edition, Karl Hanser Verlag Munich, 1967, pp. 212ff.

To close open butt joints, it is proposed in DE-OS 23 17 564 to heat the bushes and simultaneously to prevent an increase in diameter as a result of thermal expansion.

Both with this known method and with a shaping method described in DE-PS 517530, is it possible to close the butt gap in bushes.

However, if such prefabricated bushes are shaped into flanged bushes, by bending the edge of the bush, the butt joint opens up again, wherein the gap width may assume considerable dimensions depending on the diameter and flange width.

Flanged bushes with gaps can only be fitted using special tools, with which the flanged bush is compressed through the application of considerable force, wherein the flanged bush may possibly also warp, causing damage to the flanged bush.

Relatively small flanged bushes, which are transported in large numbers in cartons as loose cargo, may become hooked together, often resulting in a chain of several flanged bushes. The buyer has to separate the flanged bushes laboriously and generally by hand before fitting them. There has therefore long been a desire for flanged bushes with closed butt joints.

In flanged bushes, a closed butt joint could only be achieved by welding a ring forming the flange to a bush. The disadvantage of this method is that welding is more expensive than bending of the bush edge.

SUMMARY OF THE INVENTION

It is therefore the object of the invention to provide a bush with closed or extensively closed butt joint which does not cost any more to produce than the conventional flanged bushes obtained by bending.

A further object of the invention is to provide a suitable method and an appropriate device or bending die.

As far as the method is concerned, the object is achieved in that, at at least two points distributed around the flange in the circumferential direction, material-displacing recesses are formed at least in the metal layer of the flanged bush.

It has surprisingly been demonstrated that the material displacement caused by the formation of the recess stretches the flange in the circumferential direction in such a way that the butt gap is closed.

The formation of material-displacing recesses is a cost-effective method, especially if the recesses are produced, as preferred, by stamping.

The recesses may be formed in the inner and/or outer surface of the flange. Where the recesses are formed depends on the structure of the flanged bush, the material and the intended application. If the flanged bushes are intended for diesel engines, for example, the bush consists as a rule of a metallic backing material, on which at least one overlay has been applied. In order not to damage the overlay by the formation of material-displacing recesses, the recesses are preferably formed in the inner surface of the flange.

If, in the case of coated bushes, the recesses are to be formed additionally or solely in the outer surface of the flange, the recesses have to extend into the metallic backing layer, since otherwise not enough of the material causing the springing-open effect is displaced.

The recesses are preferably produced when bending the bush edge. Incorporation into the bending process has the advantage that no additional method step is necessary, such that the production costs do not increase relative to conventional flanged bushes. If the material-displacing recesses are formed in the flange during bending, the butt joint cannot open in the first place.

Closure of the butt joint may be controlled or the width of the butt joint may be specifically adjusted, depending on the intended purpose of the bush, by means of the size, number, shape and depth of the recesses.

The flanged bush according to the invention, which comprises no butt gap or comprises a specifically adjusted butt gap, is characterized in that the flange comprises material-displacing recesses at least in the metallic layer at at least two points distributed over the flange in the circumferential direction.

The recesses preferably take the form of impressions, and are preferably located in the inner and/or outer surface of the flange. In a further preferred embodiment, the recesses extend as far as into the outer edge of the flange. It has been demonstrated that the material-displacing recesses are most effective, the further they are formed towards the outside, when viewed in the radial direction. The number of recesses may be markedly reduced relative to the number of recesses which do not extend as far as into the outer edge of the flange. The recesses preferably widen radially form the inside to the outside. In this way, greater material displacement is caused where the circumference becomes larger. The recesses are preferably semicircular or wedge-shaped.

As an alternative or in addition to the widening of the recesses, it is advantageous for the recesses to increase in depth form the inside radially towards the outside, because the associated increase in material displacement takes account of the radially outward increase in circumference. The recesses preferably extend radially over the entire width of the flange.

The bending die according to the invention is characterized in that elevations are provided at at least two points distributed over the end face in the circumferential direction of the end face. The elevations are preferably arranged equidistantly in the circumferential direction. The elevations may exhibit a circular, oval or wedge-shaped structure. It is also possible for the elevations to take the form of radially extending webs. The elevations may be formed on the end face or take the form of exchangeable components which are inserted into the end face. Punches projecting relative to the end face are preferably inserted into the end face. The punches which may be inserted are preferably pins, which are inserted into corresponding drill holes in the end face of the bending die. It is thereby possible to arrange the bending die in variable ways, and thus, to adapt it to various widths of flanges, the diameter of the flanged bush remaining the same.

The bending device according to the invention comprises a bending die and a pressure plate acting on the bush edge to be bent, wherein the bending die and/or the pressure plate comprise elevations on the surface facing the bush edge.

THE DRAWINGS

Exemplary embodiments of the invention are explained more fully below with reference to the drawings.

Figure 8:
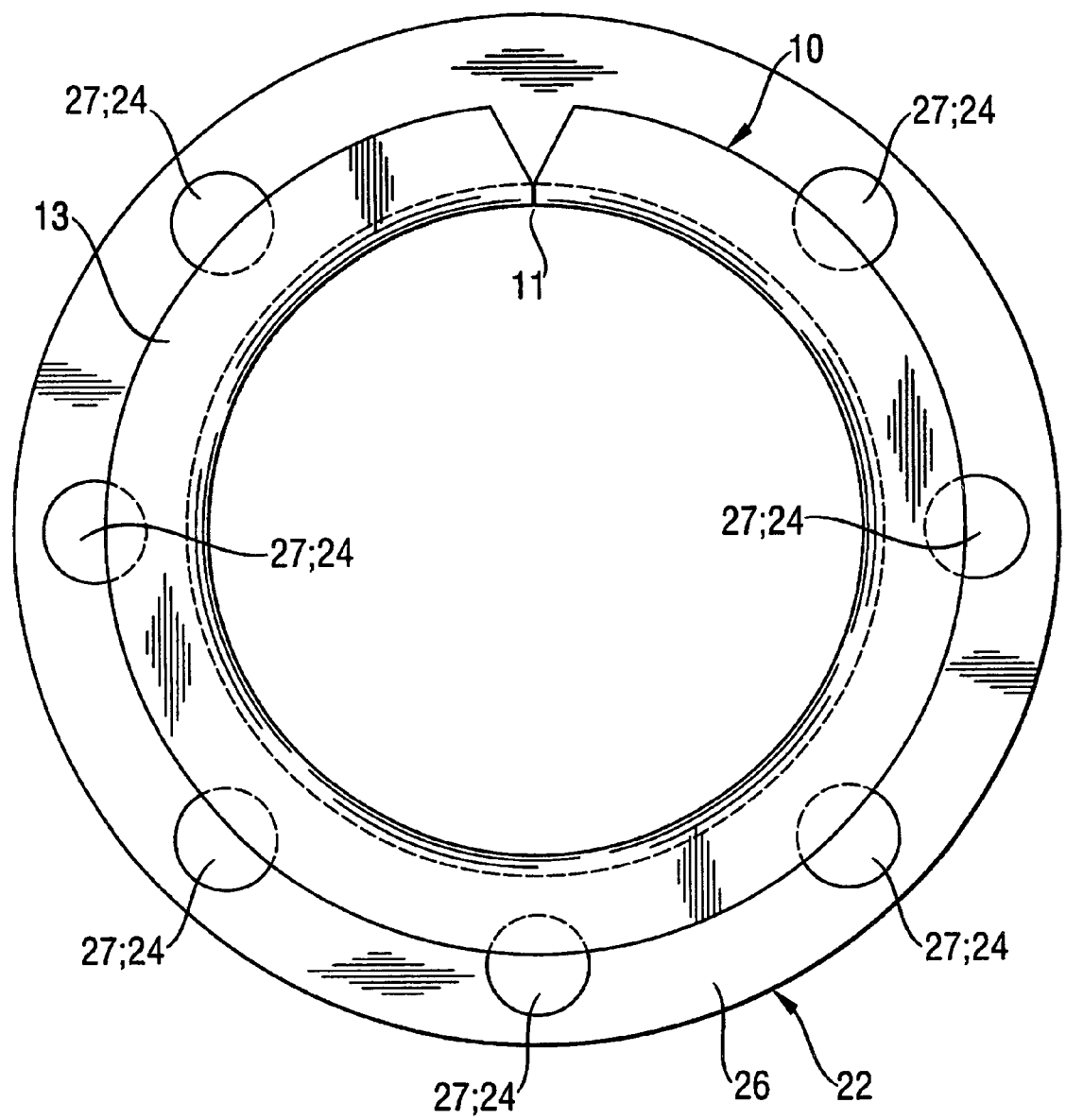

In the drawings:

FIG. 1 shows a conventional flanged bush with a flange according to the prior art, FIG. 2 is a plan view of a first embodiment of a flanged bush according to the invention, FIG. 3 is a plan view of a further embodiment of a flanged bush according to the invention, FIG. 4 is a plan view of a further embodiment of a flanged bush according to the invention, FIG. 5 shows a section through the flanged bush shown in FIG. 4, along line V—V, FIG. 6 shows a section through a flanged bush according to a further embodiment, FIG. 7 shows a vertical section through a bending device and FIG. 8 is a plan view of a bending die with flanged bush inserted therein.

DETAILED DESCRIPTION

FIG. 1 shows a conventional flanged bush 1, which comprises a cylindrical bush body 2 and a single flange 3 formed thereon, having been produced by bending of the bush edge. As a result of the production process, the flanged bush 1 comprises a considerable butt gap 5.

FIG. 2 is a plan view of a flanged bush 10 according to the invention, produced by the method according to the invention. This flanged bush 10 likewise has a cylindrical bush body 12 and a single flange 13, which comprises material-displacing recesses 16 on the inner surface 14 of the flange 13 at a plurality of equidistant points in the circumferential direction. In the embodiment of FIG. 2 shown here, the material-displacing recesses are semi-circular in form, such that the recesses widen radially form the inside outwards. The recesses are applied in such a way that they extend as far as into the outer edge 15 of the flange 13. The flanged bush 10 exhibits a closed butt joint 11.

FIG. 3 is a plan view of a flanged bush 10 according to a further embodiment. In contrast to FIG. 2, the material-displacing recesses 16' are wedge-shaped and extend over the entire width of the flange. The wedge-shaped or V-shaped configuration of the recesses 16' likewise widens radially form the inside outwards.

FIG. 4 shows a further embodiment of a flanged bush 10, wherein the equidistantly arranged material-displacing recesses 16" are rectangular in plan view. The special feature of these material-displacing recesses 16" is that the depth of the recesses increases radially from the inside outwards. This is visible in FIG. 5, which shows a section along line V—V of the flanged bush shown in FIG. 4. The flanged bush shown in FIG. 5 has a metallic backing material 17 and an overlay 18, which is applied to the outer surface 19 of the flanged bush. The recesses 16" are formed on the inner surface 14 of the flange 13, such that the overlay 18 is not impaired.

FIG. 6 is a sectional view of a further embodiment of a flanged bush. The bush is again a two-layer flanged bush, wherein, however the recesses 16''' are formed in the outer surface 19 of the flange 13. The recesses extend so far into the flange material that the material displacement affects the metallic backing material 17.

FIG. 7 shows a vertical section through a shaping device 20, which consists substantially of an upper pressure plate 21, a bending die 22 and a lower pressure plate 23. Instead of a lower pressure plate 23, the bending die 22 may also comprise a shoulder inside the bush receptacle 25, on which rests the lower end face of the bush. In a first method step, the flange 13 may be pre-bent in the manner illustrated here, such that only secondary, or post-bending must be performed with the pressure plate 21. The flange 13 is bent in the direction of the arrows, such that the inner surface 14 is pressed onto the elevations 24 arranged on the end face 26 of the bending die 22, thereby forming the material-displacing recesses.

In the embodiment shown here, the elevations 24 are web-shaped in form and extend radially over the entire width of the end face 26 of the bending die 22. It is thereby possible to provide flanged bushes having flanges 13 of different widths with the material-displacing recesses according to the invention, without the bending die 22 having to be exchanged or reset. The wide arrows indicate the pressing direction, if the shaping device 20 is arranged in a press for example. It will be seen in FIG. 7 that the elevations have a height that is less than half the thickness of the flanges 13.

FIG. 8 shows a plan view of a bending die 22 with an already shaped flanged bush 10. In the case of this bending die, the elevations 24 are formed by pins 27 inserted into the end face 26. This die may, for example, be used to produce the flanged bush shown in FIG. 2.

The invention claimed is:

1. A method for producing flanged bushes having at least one flange with axially facing inner and outer surfaces, in which the bush and flange are made from a prefabricated strip portion comprising at least one metallic layer that is shaped by wrapping such that the flange is formed by being bent around an edge;
   including forming at least two material-displacing recesses extending axially into the metal layer distributed around the flange in a circumferential direction of the flange.

2. A method according to claim 1 including forming the recesses by stamping.

3. A method according to claim 1, including forming said recesses in said inner surface of the flange.

4. A method according to claim 1, including forming the recesses in said outer surface of the flange.

5. A method according to claim 1, including forming the recesses in said inner surface and said outer surface of the flange.

6. A method according to claim 1, including forming recesses by bending the flange around the bush edge.

* * * * *

UNITED STATES PATENT AND TRADEMARK OFFICE
CERTIFICATE OF CORRECTION

PATENT NO. : 7,174,765 B2 Page 1 of 1
APPLICATION NO. : 10/467701
DATED : February 13, 2007
INVENTOR(S) : Klaus Kirchhof and Konstantinos Valasiadis It is certified that error appears in the above-identified patent and that said Letters Patent is hereby corrected as shown below:

Column 1, line 37: "bush 9c.f. DIN 1494" should be --bush (c.f. DIN 1494--.

Column 1, line 40: "Betriebstechnisches Taschenbush" should be --"Betriebstechnisches Taschenbush"--.

Column 1, line 47: "is it possible" should be --it is possible--.

Column 2, line 66: "widen radially form the" should be --widen radially from the--.

Column 3, line 5: "depth form the inside" should be --depth from the inside--.

Column 4, line 6: "widen radially form the inside" should be --widen radially from the inside--.

Column 4, line 15: "radially form the inside" should be --radially from the inside--.

Column 5, line 12: "claim 1 including" should be --claim 1, including--.

Column 6, line 1: "including forming said" should be --including forming the--.

Column 6, lines 10-11: "including forming recesses" should be --including forming the recesses--.

Signed and Sealed this

Thirteenth Day of November, 2007

JON W. DUDAS
*Director of the United States Patent and Trademark Office*